US010547590B1

(12) United States Patent
Matthews et al.

(10) Patent No.: US 10,547,590 B1
(45) Date of Patent: Jan. 28, 2020

(54) NETWORK PROCESSING USING ASYNCHRONOUS FUNCTIONS

(71) Applicant: Amazon Technologies, Inc., Seattle, WA (US)

(72) Inventors: Nicholas Channing Matthews, Atlanta, GA (US); Felton Samuel Dengler, IV, Decatur, GA (US)

(73) Assignee: Amazon Technologies, Inc., Seattle, WA (US)

(*) Notice: Subject to any disclaimer, the term of this patent is extended or adjusted under 35 U.S.C. 154(b) by 280 days.

(21) Appl. No.: 15/632,276

(22) Filed: Jun. 23, 2017

(51) Int. Cl.
| | | |
|---|---|---|
| *G06F 9/00* | (2006.01) | |
| *H04L 29/06* | (2006.01) | |
| *H04L 29/12* | (2006.01) | |
| *H04L 29/08* | (2006.01) | |
| *H04L 12/741* | (2013.01) | |
| *H04L 12/46* | (2006.01) | |
| *G06F 9/455* | (2018.01) | |

(52) U.S. Cl.
CPC ...... *H04L 63/0281* (2013.01); *H04L 12/4633* (2013.01); *H04L 45/745* (2013.01); *H04L 61/256* (2013.01); *H04L 61/35* (2013.01); *H04L 63/029* (2013.01); *H04L 67/2814* (2013.01); *G06F 9/45533* (2013.01); *H04L 61/6013* (2013.01); *H04L 63/0245* (2013.01)

(58) Field of Classification Search
CPC ............. H04L 63/0281; H04L 12/4633; H04L 45/745; H04L 61/256; H04L 61/35; H04L 63/029; H04L 67/2814; H04L 61/6013; H04L 63/0245; G06F 9/45533
See application file for complete search history.

(56) References Cited

U.S. PATENT DOCUMENTS

2014/0195645 A1* 7/2014 Cohen ............... H04L 67/32 709/219
2016/0092252 A1* 3/2016 Wagner .............. G06F 9/45533 718/1

* cited by examiner

*Primary Examiner* — Baotran N To
(74) *Attorney, Agent, or Firm* — Thorpe North & Western, LLP.

(57) ABSTRACT

A technology is provided for proxying network traffic. A computer system activates a proxy function in response to a network communication identified in a compute service of a service provider environment. The system receives parameters from the network communication originating from a client at the proxy function and the parameters identify a destination function and a network packet. The proxy function is applied to the network packet. The system launches the destination function with the network packet and parameters from the proxy function, wherein the destination function is configured to launch on a computing instance of the compute service.

20 Claims, 8 Drawing Sheets

US 10,547,590 B1

NETWORK PROCESSING USING ASYNCHRONOUS FUNCTIONS

BACKGROUND

Computing systems may include computing and data storage systems to process, transfer, and store data. Some computing providers of computing systems have begun offering centralized, virtualized computing options known as service provider environments that may reduce overall costs, improve availability, improve scalability, and reduce time to deploy new applications.

Computing systems and devices may be linked to one another via computing networks for exchanging data and content from one device to another. Computing systems may communicate with other networked computing systems across a network. Accordingly, computing systems may also access a service provider environment (e.g., a centralized virtual computing environment) using physical and virtual computing networks. Computing systems may also access services offered by the service provider environment using virtualized computing resources. An example of one virtualized computing resource offered by a service provider environment is the ability to execute a block of program code on a compute service while the compute service manages the execution of the program code. Thus, the customer receives the results from the program code while avoiding managing the details of how the program code is executed. However, the program code may execute for just milliseconds and is not directly network addressable with a network address, and this lack of being able to directly address network communications to the program code may reduce the ease of network communications with the program code.

DETAILED DESCRIPTION

Figure 1:
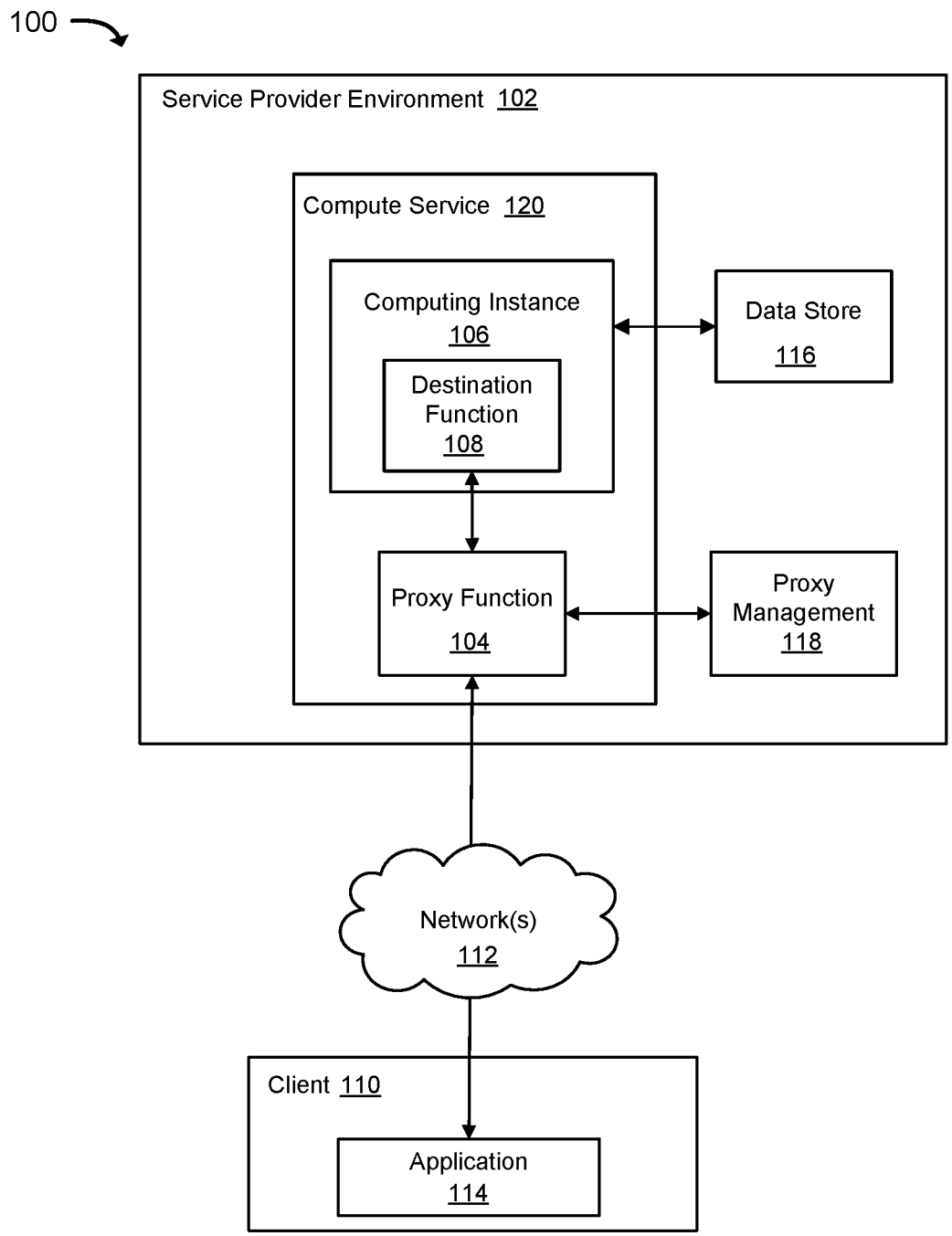
FIG. 1 is a block diagram illustrating a system for proxying network traffic using a function in a service provider environment, according to an example of the present technology.

The present technology may provide one or more asynchronous functions in a service provider environment that may be used as a proxy networking layer to tunnel network traffic that is encapsulated and/or intercepted at a client device. Network communications or network traffic that may normally be directed through a computer network can be directed to a proxy function for proxying traffic. The proxy function may be an asynchronous function or code segment which is executable in a compute service of the service provider environment. The proxy operations provided by the proxy function may include packet inspection, packet blocking, duplicating packets, packet sampling, and/or calling a destination function to perform work on a network packet received from the client. The network communication may originate with a client outside of a service provider environment and may contain one or more network packets and parameters that are to be used in launching a proxy function and/or a destination function.

In one example, a client may send a network communication where a destination function or networked client is the ultimate destination for the network packet and for parameters within the network communication. For example, the network communication may be sent using a RESTful API (application program interface) call, or the network communication may be an event triggered by putting data into a storage bucket in a storage service on the service provider environment. The destination function may not be executing when the network communication is initially made. A proxy function may be launched by a compute service in response to receiving the network communication from the client. The proxy function may then be applied to the network packet extracted from the network communication, and the proxy function may in turn cause the destination function to launch using the network packet and parameters as input to the destination function. The destination function may process the network packet and parameters and then return values to the proxy function based on the network packet contents and parameters. The proxy function may then send the return values to the originating client or another recipient network address by way of the proxy function.

A destination function may be a function that launches in a container on a computing instance in the service provider environment and is a segment of program code that is capable of receiving parameters, performing processing, and returning values. In addition, the destination function is terminated at the computing instance once the destination function returns values. Similarly, the proxy function may also be a portion of program code that may be launched via a compute service in a container on a computing instance or directly on a computing instance in a service provider environment, and the proxy function may terminate and be removed from the container or computing instance once the proxy function has executed.

The proxy function may be set up to launch in response to an event on the service provider environment or an API call over a network. The proxy function may launch and run for only a few milliseconds, for example. Since the destination function and the proxy function may execute only briefly, the asynchronous functions may be used to proxy and tunnel network traffic from the client and then perform processing with the data from the network packets based on an event level of granularity (e.g., the event being when one or more network packets are received). In other words, processing on network packets is initiated in response to the events in the service provider environment or network calls containing the network packets.

In one aspect, the network communication comprises information that communicates to the proxy function at least one network packet and identifies the end destination function. The network communication sent to the destination function can also pass the network packet, parameters, and a socket for tunneling traffic back to the proxy function. The destination function may then send subsequent return traffic to the proxy function using the socket.

In one aspect, the proxy function may apply network address translation (NAT) to the received tunneled packet. The proxy function may copy the packet into memory, and then send the packet out to the network for receipt by a recipient client. The proxy function may send that copied packet through another tunnel to the packet receiver such as a security or performance analysis device. This configuration may also be used for port mirroring, promiscuous mode, checking for packet misrouting, testing for malware using a separate analyzer, or intrusion detection analyzers. In one aspect, the proxy function may copy all received network packets into storage (e.g., for logging purposes).

This technology enables computing resources within a service provider environment which are "event driven" or asynchronous to consume network packets and similarly addressed network traffic which uses a network address. Many existing analysis tools and processes do not apply well to the emerging methods of asynchronous or event driven computing resources in a service provider environment, and such existing asynchronous or event driven computing resources may not be able to copy packets from existing networking inputs or interfaces (e.g., off a wire, from a socket, directly from a NIC (networking interface controller), etc.) in order to process the packets. Some computing resources in the service provider environment may have networked components or resources that do not have a network address (e.g., an IP address) and are not directly addressable, but may be accessed using asynchronous network calls (e.g., API calls) or events triggered inside the service provider environment. The ability of such computing resources to process raw packets is useful for application troubleshooting, network traffic troubleshooting, security monitoring, application performance monitoring and visibility purposes. For example, a proxy function may execute for milliseconds and terminate, which may make typical addressed network access difficult. However, the use of a proxy function with network packets and similar traffic is provided through the present technology.

Accordingly, computing customers may instrument applications on client devices using software to: capture network packets, transport network packets and provide the network packets to proxy functions in order to access or use the compute power of a compute service in the service provider environment. Such network packets may include a source and destination address for the network packets and a packet payload. Captured network requests may include one or more network packets in the packet payload to be processed by the proxy function and the packet may include other payload information to be processed by a destination function in the service provider environment.

FIG. 1 illustrates a computing environment 100 for proxying network traffic. The computing environment 100 may include a service provider environment 102. The service provider environment 102 may be described as an environment for hosting virtualized computing services (e.g., virtualized networking devices, storage, and processing services, etc.) accessible to customers and client devices. For example, the service provider environment 102 may include a compute service 120 configured to execute asynchronous function code in a container in a computing instance 106 hosted on physical computing devices that are part of the service provider environment 102.

The service provider environment 102 may be networked to communicate to at least one client device 110 through a network 112. The network may include the internet and other private or public computer networks. The client 110 may be any type of computing client that is able to send networked communications to the service provider environment 102. In one aspect, the client 110 has an application 114 that may generate network packets that are to be processed by the service provider environment 102. For example, the application 114 may send a network communication to the service provider environment 102 containing the network packets. In one more detailed aspect, the network communication is a network call, and the network communication may be an event from the service provider environment 102 or an application program interface (API) call to the service provider environment 102. An example of an event in the service provider environment 102 may be: a data storage event where data is stored to a data bucket, a table event for a NoSQL database, a messaging event, a logging event or other events that occur in the service provider environment 102. When an event occurs, this may launch the proxy function 104 or another function in the compute service 102 and the proxy function 104 may load network packets from the data bucket, NoSQL data base or other storage location in the service provider environment 102.

In one aspect, a network communication originated by the client 110 includes a network packet and parameters to be ultimately sent to a destination function 108. The destination function 108 may execute or launch when called up to perform a function by the proxy function 104. For example, the destination function 108 may launch on a computing instance 106 of the service provider environment 102 and is a segment of program code that is capable of receiving parameters, performing processing, and returning values, and the destination function is terminated at the computing instance once the destination function returns values.

A proxy function 104 may receive the network communication from the client 110 prior to the destination function 108 being launched. In one aspect, the application 114 on the client 110 is able to communicate with the proxy function 104 by sending the network communication to the compute service 120 which launches the proxy function 104 and passes a network packet and parameters to the proxy function 104. The parameters from the application 114 or client 110 may include the packet destination, which packets to filter, packet orderings or timestamps, and any other parameters.

The network communication may include network packets and other parameters that are captured at the application 114 on the client 110 using an SDK (software development kit), libraries, or other overriding functions and code. The libraries may encapsulate the network packet generally speaking or more specifically encapsulate the network packet in a RESTful API call to the service provider environment 102, including any needed parameters. Alternatively, other types of encapsulation may be used for the network packets from the application 114, such as generic routing encapsulation (GRE), overlay protocols and other encapsulation that may be removed by a proxy function 104.

The network communication may use a GUID (globally unique identifier) to identify a source of a network packet, such as an encapsulation function, a destination function 108, the proxy function 104 or another source function in the compute service 120. The GUIDs may be referenced to a data store where corresponding identifier information may be looked up. Alternatively, the GUIDs could be used to represent a source function to be called in the compute service 120. Such identifiers may be used to check the flow of data or the connectedness of a networking session, etc.

The proxy function 104 may be a function that launches in a container on a computing instance in the service provider environment and is a segment of program code that is capable of receiving parameters, performing processing, returning values, and the proxy function 104 may be terminated at the computing instance once the proxy function returns values 104. In one aspect, the proxy function 104 may be launched on a computing instance 106 of compute service 120 in the service provider environment 102. The proxy function 104 may be described as a proxy layer for receiving a network communication from the client 110. The network communication may include at least one network packet that is a parameter received at the proxy function 104. The proxy function 104 may use the network packet and associated parameters provided to the proxy function 104 to determine a destination for the network packet. For example, the destination defined by the parameters may be the destination function 108.

The proxy function 104 may further be configured to extract or obtain the encapsulated network packet from the network communication and then have the network packet be processed within the proxy function 104. The service provider environment 102 may host a plurality of destination functions 108 designed to be executed on computing instances 106 of the service provider environment 102. In one aspect, upon completion of the processing of the network packet in the proxy function 104, the destination function 108 may be launched by the proxy function 104 and execute at the computing instance 106. In this aspect, the network packet may be sent to the destination function 108 along with parameters for the destination function 108 and a socket for tunneling traffic back to the proxy function 104. The destination function 108 may receive the network packet with other parameters from the proxy function 104. In one configuration, the parameters passed to the destination function 108 may be identical to the parameters received by the proxy function 104. For example, the proxy function 104 may not alter the parameters of the network communication. Alternatively, the parameters sent to the destination function 108 may be a second set of parameters that are modified as compared to the parameters received by the proxy function 104. For example, the second set of parameters may be greater or smaller in number than the parameters received from the proxy function or the values may have changed. The proxy function 104 may add to the parameters by adding network packet status flags or adding error messages to the initial parameters. The proxy function 104 may reduce the parameters by removing or deleting parameters that the proxy function 104 deems not necessary to pass on the destination function 108. The proxy function 104 may alter or change the values in the initial parameters by performing computing operations on the parameters before the parameters are passed on to the destination function 108. The destination function 108 may then process the packet and/or parameters and generate return values based on the packet and/or parameters. The return values may then be sent to the proxy function 104 which may further send the return values to the client 110. The return values may be the results requested by the client 110 in the network communication.

In one aspect, the application 114 of the client 110 is able to communicate with the proxy function 104 via the compute service 120 to send the network communication. Therefore, the proxy function 104 may be able to act as an intermediary for network traffic both inbound and outbound for the destination function 108. This is useful because the proxy function 104 may provide temporary proxy functionality on an as needed basis. In contrast, a fixed proxy server or permanent proxy device incurs the on-going costs of hosting and computing power because the proxy server is constantly on and the proxy processing is not divided into smaller processing units as with the proxy function 104.

In one configuration, subsequent network traffic between the client 110 and the destination function 108 may be sent through the proxy function 104 based on a socket sent to the destination function 108 with the network packet. In an additional packet duplication configuration, the proxy function 104 may perform network address translation (NAT) for the network packets and copy network packets into a memory associated with the service provide environment 102. The network packet may be copied and sent through another tunnel and through the virtual network and physical network of the service provider environment 102 to a packet receiver such as a security or performance device. An administrator may also be able to receive the duplicated network packets. For example, the administrator may access duplicated network packets that are stored in the data store 116 by the proxy function 104 or the destination function 108. The duplication of network packets using the proxy function may enable monitoring of application traffic using asynchronous function calls across a network.

A proxy function 104 may be provided for each destination function 108. This provides a simple one-to-one mapping between the proxy functions 104 and the destination functions 108. Alternatively, the proxy function 104 may be configured to send network packets 104 to many destination functions 108 in a one-to-many type of mapping.

In one aspect, the proxy function 104 may be described as one or more asynchronous functions or code segments. An initial proxy function 104 may call other proxy functions, as needed. In one aspect, the proxy function 104 is initiated or launched through function declarators defined in the application 114. By using function declarators specific to the proxy functionality, any function in the application that is marked or decorated with a proxy declarator may override the socket functions for networking transport (e.g., functions for sending network packets using TCP/IP (transmission control protocol/internet protocol) or other packet protocols) from the client 110. In one aspect, the application's networking sockets may be overridden to encapsulate the network packets and send them using a network communication to the proxy function 104, where the proxy function 104 may then forward network packets to the proper destination for processing, such as the destination function 108. In one aspect, network traffic received at the proxy function 104 may undergo secure network address translation (SNAT) so that the proxy function 104 may map a network packet in the network communication before forwarding the network packet to the destination function 108.

In one aspect, the proxy function 104 may be employed for security purposes. More specifically, logic on the proxy function 104 may be employed to filter certain network packets or data, including filtering network packets such that the network packet will not reach the destination function 108 if the network packet is filtered or blocked by the proxy function 104. For example, predetermined sources or destinations associated with the network packets or network messages may be blocked. An example of additional filtering may be deep packet inspection which examines the data (and possibly the header) of a packet in the proxy function 104, searching for protocol non-compliance, viruses, spam, intrusions, or defined criteria to decide whether to allow the network packet to pass, whether to block the packet, or if the network packet needs to be routed to a different destination. In another example, if applications or functions were leaking out credit card information or cryptography certificates, then such network packets can be blocked.

Sampling of the network packets may occur where 1 out of every N packets is sampled and analyzed. The proxy function can also be set to limit ingoing or outgoing connections or both based on pre-defined criteria that can be applied to the network connections. Further, timestamps in the network packets from the application 114 can be used to order packets received by the proxy function 104.

A proxy management service 118 or component may be employed to write and enforce replication or blocking policies for the network communications. The proxy management service 118 may include black lists and white lists for sources or destinations to be blocked. In addition, the proxy management service may manage the types of network packets or traffic that may be blocked or filtered using dynamic rules stored by the proxy management service 118. This information may be dynamically retrieved from the proxy management service when the proxy function 104 is loaded.

In one aspect, the network communication or a portion of the network communication (e.g., a network packet extracted from being encapsulated in the network communication or loaded from a storage location in response to network communication or event) may be sent to the destination function 108 where the destination function 108 performs a processing operation in the service provider environment 102. The destination function 108 may be triggered by the proxy function 104 to receive the network packet and perform a computing operation or function on the network packet or the contents of the network packet in order to offload such processing from the client 110.

The compute service 120 may include a computing instance 106 with access to a data store 116 or other data stores in the service provider environment. The computing instance 106 may include a destination function 108 that is capable of executing on the computing instance 106. The destination function 108 may retrieve a stored network packet or other data store information from the data store 116 as defined by the code of the destination function 108. The destination function 108 is a segment of program code that may be like a function, and the destination function 108 may receive parameters, perform processing and provide return values to the requestor. The destination function 108 may also be called a "compute service code" or "compute service program code." In one aspect, the destination function 108 may execute on a managed compute service code platform or compute service 120 that executes a defined destination function 108 on a computing instance 106. That is, the destination function 108 may execute in a compute service 120 that executes code in response to requests to execute the destination function 108 and automatically manages the compute resources used by that destination function 108. Once the destination function 108 has been executed and the appropriate results have been returned, the destination function 108 and results may be removed from memory of the computing instance 106 (and/or container) in which the destination function 108 was executing. The use of a destination function 108 provides for building on-demand applications that may be responsive to events that occur in the service provider environment 102 and API calls from any client 110. For example, the destination function 108 may be used to automatically provision virtualized computing services triggered by requests to the destination function 108. In one aspect, the destination function 108 may be triggered in response to an event in the service provider environment 102 and may execute or perform a function in response to the event. In addition, the destination function 108 may return a response or value(s).

Figure 2A:
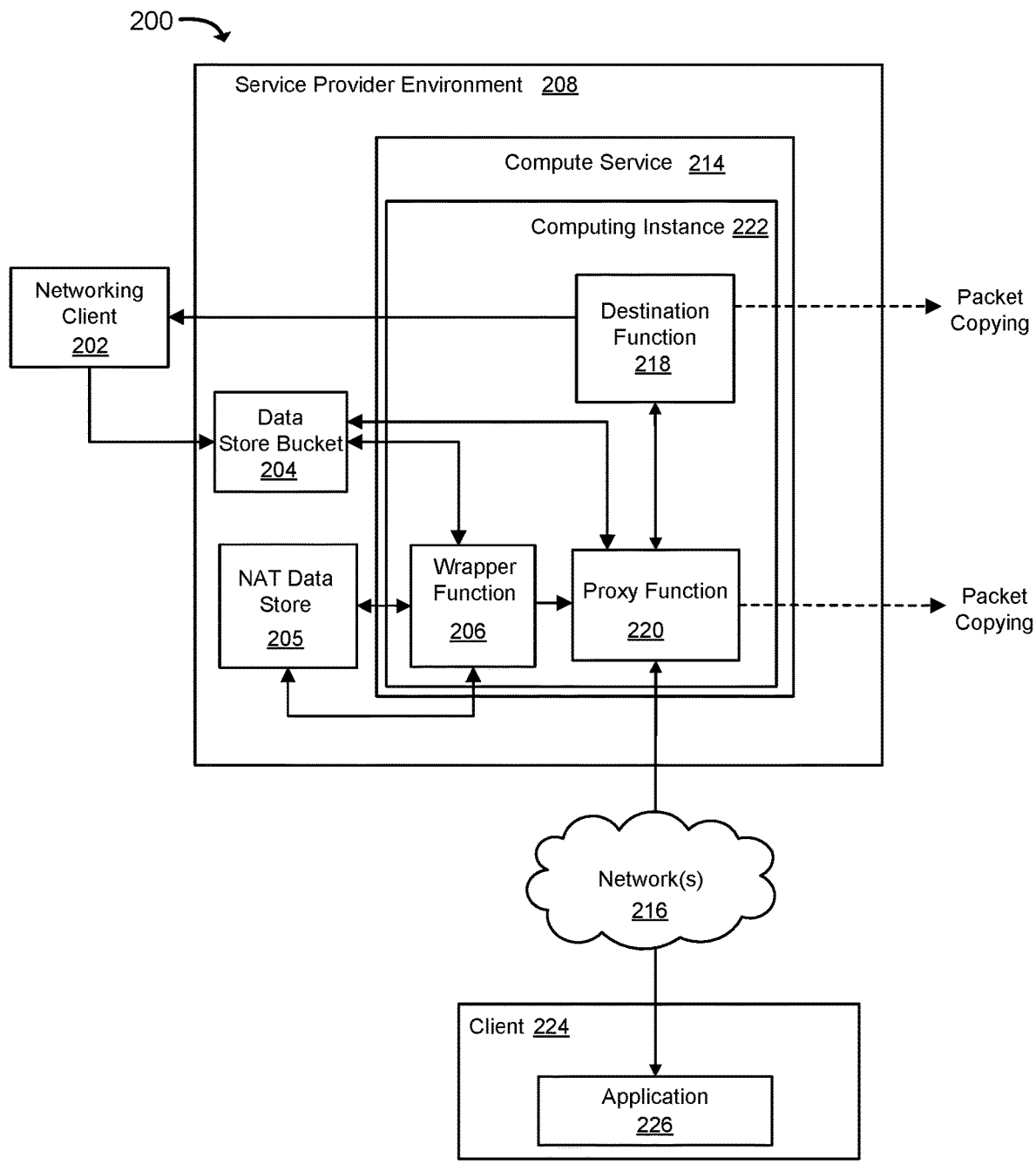
FIGS. 2A-2B are block diagrams illustrating a system for proxying network traffic of a networking client outside a service provider environment, according to an example of the present technology.

FIG. 2A illustrates a computing environment 200 for proxying network traffic with a networking client 202 outside a service provider environment 208. The computing environment 200 may include may include some of the features, components, or capabilities of computing environment 100 of FIG. 1. For example, a computing instance 222, a network 216, and application 226 may have similar functions and features to the computing instance 106, the network 112, and the application 114 of FIG. 1. In one aspect, the computing environment 200 includes a client 202 outside of the service provider environment 208. The networking client 202 may be a computing system such as a server computer, router, bridge, switch, gateway, or other networking component capable of completing processing requests. The networking client 202 may be a virtual computing instance in a separate public or private computing environment. In one aspect, the proxy function 220 may determine that the destination for the network packet of the network communication is the networking client 202. In one configuration, the proxy function 220 may send the network communication or the network packet directly to the networking client 202.

In one aspect, the destination function 218 receives the network packet and forwards the network packet to the networking client 202. The networking client 202 may then process the parameters of the network packet to generate return values or return network packets. The return values may be sent to the destination function 218 or the proxy function 220 to then be forwarded on to the client 224. The network packet may also be duplicated or copied and stored for access by a user such as an administrator. The network packet may be copied by either the destination function 218 or the proxy function 220.

In one aspect, the networking client 202 generates the return values and sends the return values to a data store bucket 204 in the service provider environment 208. The creation of the return values in the data store bucket 204 may trigger an event which launches a wrapper function 206 in the compute service 214 with the return values and/or a network packet in the data store bucket as parameters for the wrapper function 206. The wrapper function 206 may examine the network packet from the networking client 202 and retrieve NAT (network address translation) information (or SNAT) from a NAT data store 205. The NAT data store 205 may be located in part of the service provider environment 208 and may be a virtualized database hosted by services of the service provider environment 208. Examples of data stores that may be used may include NoSQL data stores, SQL data stores, object data stores, and other virtualized data stores. The NAT information in the database may map the network packet received from the networking client back to the proxy function 220.

The proxy function 220 may receive the network packet and any other parameters and may access NAT entries in the data store 204 and may then forward the return values or return networking packets to the client 224 using the NAT information. The proxy function 220 may not execute or run constantly and may be launched in response to an event, a network call from the wrapper function 206, an API call, or another command. Once the proxy function 220 terminates, the return values or return network packets will no longer be held in memory associated with the proxy function 220.

Figure 2B:
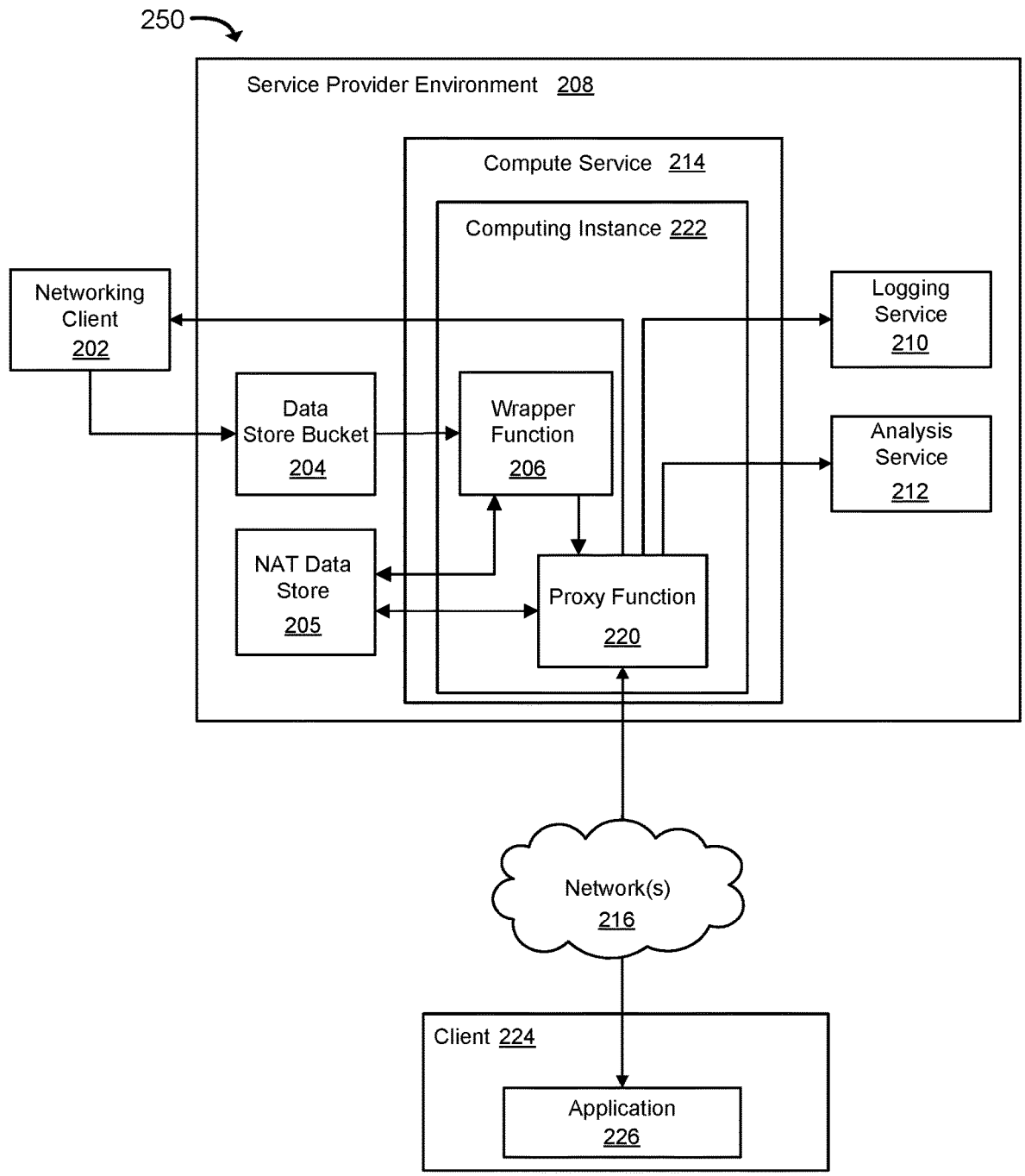

FIG. 2B illustrates a block diagram of a computing environment 250 for proxying network traffic. The computing environment 250 may include may include some of the features, components, or capabilities of computing environment 200 of FIG. 2A. In this configuration, the proxy function 220 may send a network packet directly to a networking client 202 using a socket. In addition, copies of the network packets may be sent to a logging service 210, an analysis service 212 or any other device or service for which the proxy function may be programmed to duplicate the network packets. In one aspect, the database 204 is used to store copies of the network packets. The database 204 may be a NAT database.

Figure 3:
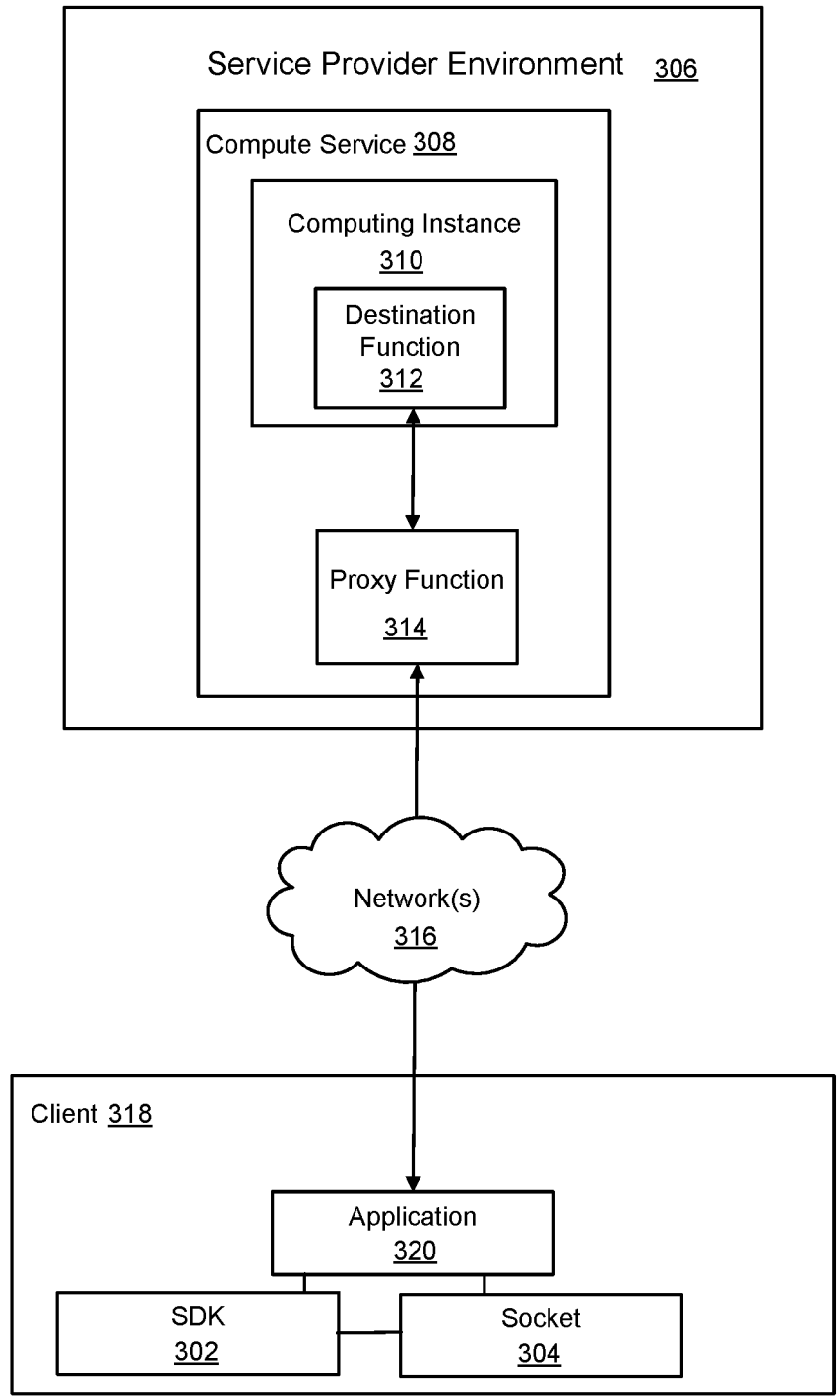
FIG. 3 is a block diagram illustrating a system for intercepting network traffic using a software development kit at a client, according to an example of the present technology.

FIG. 3 illustrates a computing environment 300 for proxying network traffic using a software development kit at a client. The computing environment 300 may include may include some of the features, components, or capabilities of computing environment 100 of FIG. 1 and/or computing environments 200 and 250 of FIGS. 2A and 2B. For example, a compute service 308, a computing instance 310, a destination function 312, a network 316 may have similar functions and features to the compute service 120, the computing instance 106, the destination function 108, and the network 112 of FIG. 1 In one aspect, the application 320 of the client 318 is configured to generate the network communication with parameters to send to the proxy function 314 in the service provider environment 306 for processing. The application 320 may be developed to generate the network communications in a defined networking format or protocol. However, the application 320 may not have been originally developed to generate the network communication to properly function with the service provider environment 306. To enable the network communication with at least one network packet to be created, the client 318 may be modified with a software development kit (SDK) 302. The SDK 302 may operate to intercept network traffic generated by the application 320 by overriding existing network communications using programmatic inheritance. For example, network sockets and TCP/IP communications may be overridden. Then the application 320 can modify the communications to the network by encapsulating network packets into network communications (e.g., API calls to the compute service) so that the network packets may be received by the proxy function 314 in the service provider environment 306. In one aspect, the SDK 302 may override an existing socket 304 and use API calls to send the network communications from the application 320 to proxy function 314 in the service provider environment 306.

The SDK illustrated in this FIG. 3 may also be applicable to the networking client 210 in FIGS. 2A and 2B and the client 110 of FIG. 1. Each of these clients may be instrumented to capture network packets or override the networking functions of an application or client. In some cases, the overriding functions may be inserted automatically by an application that searches for network code and overrides the network API calls, network sockets and other networking code and re-writes to code to capture the network packets. Alternatively, the networking code may be re-written by developers using inheritance functions to override the normal networking functions. The SDK, networking wrapper or inheriting functions may be written to re-write a destination address for the network calls and network packets.

Figure 4:
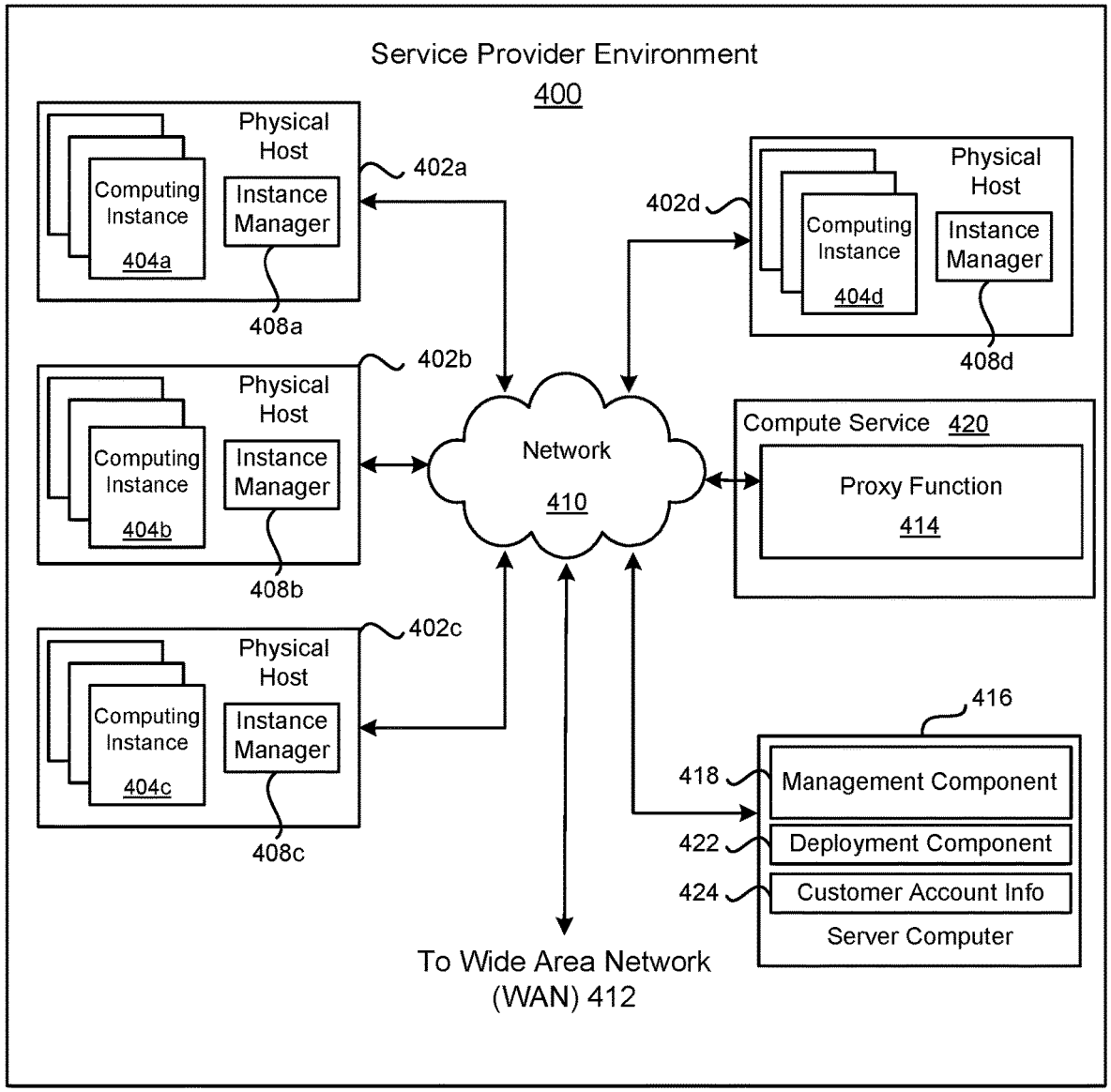
FIG. 4 is a block diagram that illustrates an example service provider environment according to an example of the present technology.

FIG. 4 is a block diagram illustrating an example service provide environment 400 that may be used to execute software services. In particular, the service provider environment 400 depicted illustrates one environment in which the technology described herein may be used. The service provider environment 400 may be one type of environment that includes various virtualized service resources that may be used, for instance, to host computing instances 404a-d on which a computing services may execute. In one aspect, the host service of the present technology may employ virtualized servers in a service provider environments. Each of the computing instances 404a-d may host one or more destination functions such as destination function 108 of FIG. 1. A proxy function 414 executing in a compute service 420 may be used send network packets to the destination functions executing on the computing instances 404a-d.

The service provider environment 400 may be capable of delivery of computing, storage and networking capacity as a software service to a community of end recipients. In one example, the service provider environment 400 may be established for an organization by or on behalf of the organization. That is, the service provider environment 400 may offer a "private cloud environment." In another example, the service provider environment 400 may support a multi-tenant environment, wherein a plurality of customers may operate independently (i.e., a public cloud environment). Generally speaking, the service provider environment 400 may provide the following models: Infrastructure as a Service ("IaaS"), Platform as a Service ("PaaS"), and/or Software as a Service ("SaaS"). Other models may be provided. For the IaaS model, the service provider environment 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the service provider environment platform without incurring the cost of buying and managing the underlying hardware and software. The SaaS model allows installation and operation of application software in the service provider environment 400. End customers may access the service provider environment 400 using networked clients, such as desktop computers, laptops, tablets, smartphones, etc. running web browsers or other lightweight client applications, for example. Illustratively, the service provider environment 400 may be described as a "cloud" environment.

The particularly illustrated service provider environment 400 may include a plurality of server computers 402a-d. While four server computers are shown, any number may be used, and large data centers may include thousands of server computers. The service provider environment 400 may provide computing resources for executing computing instances 404a-d. Computing instances 404a-d may, for example, be virtual machines. A virtual machine may be an instance of a software implementation of a machine (i.e., a computer) that executes applications like a physical machine. In the example of a virtual machine, each of the server computers 402a-d may be configured to execute an instance manager 408a-d capable of executing the instances. The instance manager 408a-d may be a hypervisor, virtual machine monitor (VMM), or another type of program configured to enable the execution of multiple computing instances 404a-d on a single server. Additionally, each of the computing instances 404a-d may be configured to execute one or more applications.

One or more server computers 416 may be reserved to execute software components for managing the operation of the service provider environment 400 and the computing instances 404a-d. A server computer 416 may execute a management component 418. A customer may access the management component 418 to configure various aspects of the operation of the computing instances 404*a-d* purchased by a customer. For example, the customer may setup computing instances 404*a-d* and make changes to the configuration of the computing instances 404*a-d*.

A deployment component 422 may be used to assist customers in the deployment of computing instances 404*a-d*. The deployment component 422 may have access to account information associated with the computing instances 404*a-d*, such as the name of an owner of the account, credit card information, country of the owner, etc. The deployment component 422 may receive a configuration from a customer that includes data describing how computing instances 404*a-d* may be configured. For example, the configuration may include an operating system, provide one or more applications to be installed in computing instances 404*a-d*, provide scripts and/or other types of code to be executed for configuring computing instances 404*a-d*, provide cache logic specifying how an application cache may be prepared, and other types of information. The deployment component 422 may utilize the customer-provided configuration and cache logic to configure, initialize, and launch computing instances 404*a-d*. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the service provider environment 400 and the server computers 402*a-d*, 416. The network 410 may be a local area network (LAN) and may be connected to a Wide Area Network (WAN) 412 or the Internet, so that end customers may access the service provider environment 400. The network topology illustrated in FIG. 4 has been simplified; many more networks and networking devices may be utilized to interconnect the various computing systems disclosed herein.

Figure 5:
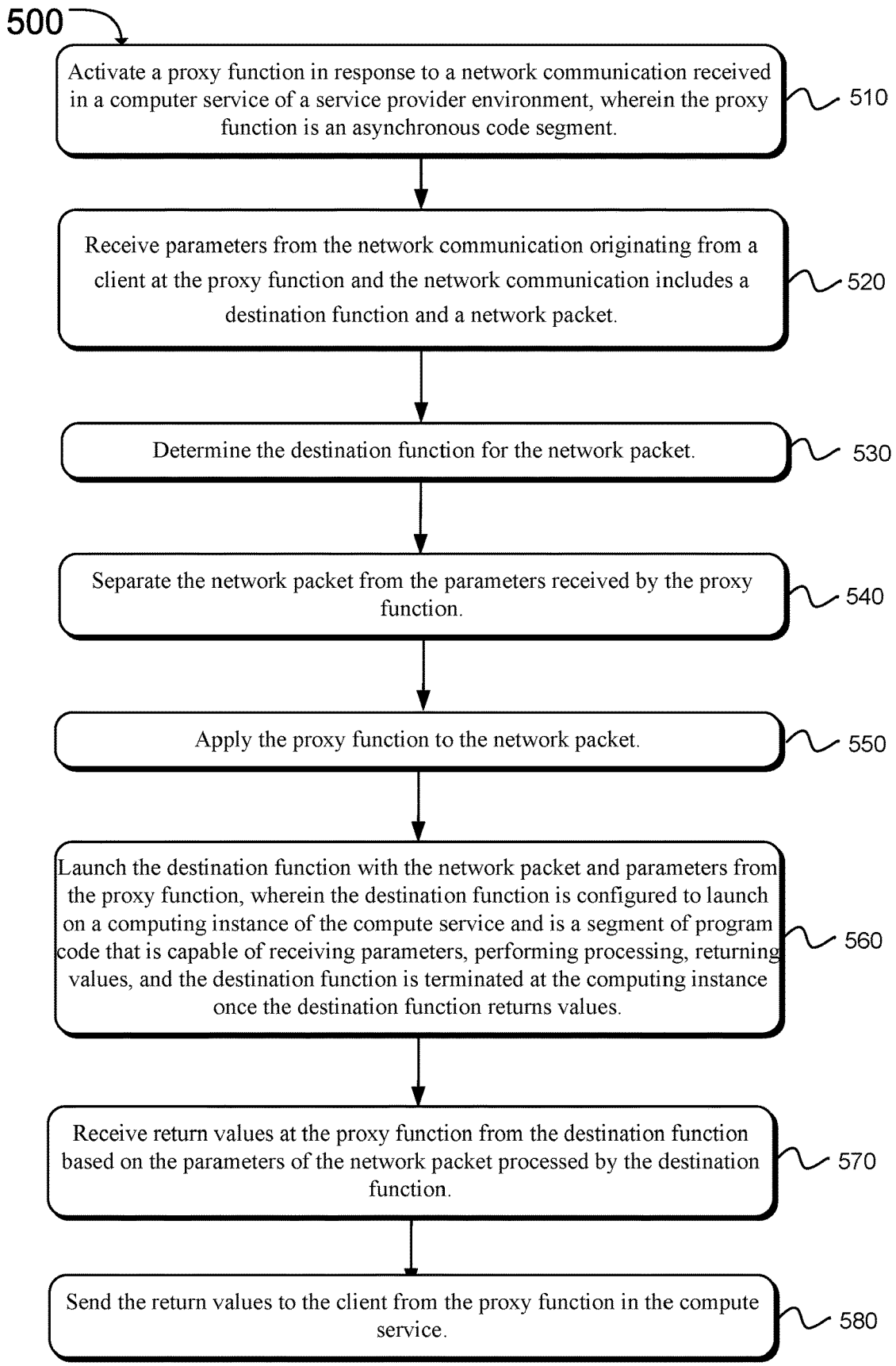
FIGS. 5 and 6 are flowcharts of example methods for proxying network traffic using a function in a service provider environment according to an example of the present technology.

FIG. 5 is a flowchart of an example method 500 for proxying network traffic according to an example of the present technology. The functionality 500 may be implemented as a method and executed as instructions on a machine, where the instructions are included on at least one non-transitory machine-readable storage medium. In one aspect, the machine may be a virtual machine, a virtual server or physical server which supports a compute service such as the compute service 120 of FIG. 1. For example, starting in block 510, a proxy function may be activated in response to a network communication received in a compute service of a service provider environment, where the proxy function may be described as an asynchronous code segment. Another operation is to receive the network communication originating from a client at the proxy function, where the network communication includes parameters identifying a destination function and the network communication includes a network packet, as in block 520. The destination function for the network packet can be determined, as in block 530. For example, the parameters of the network communication may include a destination name or address that identifies the destination function. Alternatively, the network packet may include data that identifies the destination function.

The network packet may be separated from the network communication at the proxy function, as in block 540. For example, the network packet may be contained in the parameters of the network communication (e.g., API call) and the proxy function may have program logic to identify the packet in the parameters obtained with the network communication. A proxy function may then be applied to the network packet, as in block 550. For example, the proxy function may be launched or executed in response to the network communication being received at the compute service, and the proxy function may then be applied to the network packet to perform operations such as identifying the destination of the network packet, filtering the network packet, packet inspection, launching a destination function, copying the network packet to storage or any other computing functions programmed into the proxy function for application to the network packet. Another operation may be to launch the destination function with the network packet and the parameters from the network communication. Alternatively, the parameters sent to the destination function may be a second set of parameters that are different from the parameters received by the proxy function. For example, the second set of parameters may be greater or smaller in number than the parameters received from the proxy function or the values may have changed (e.g., a modified GUID acting a source identifier, a hop counter may be increased, values may be transformed, etc.). The destination function is configured to launch on a computing instance of the compute service and is a segment of program code that is capable of receiving parameters, performing processing, and returning values, and the destination function is terminated at the computing instance once the destination function returns values, as in block 560. Return values may be received at the proxy function from the destination function based on the parameters of the network packet being processed by the destination function, as in block 570. In addition, the return values may be sent to the client from the proxy function in the compute service, as in block 580.

In one aspect of the method 500, the proxy function may be a set of asynchronous functions. For example, the asynchronous functions may be event driven where the event may be receiving the network communication from a client, and the client may not be waiting for the proxy function to complete. The asynchronous functions may then launch, perform processes, return results, and then terminate once the processing is completed. In another aspect, the method further comprises, launching a proxy function which acts as a proxy layer for the network packet. For example, the proxy function may be designed to launch in response to the network communication being received. The proxy function may then identify the network packet within the network communication, optionally filter or inspect the network packet and send the network packet to an identified destination function. Thus, the proxy function may act as a proxy layer.

Figure 6:
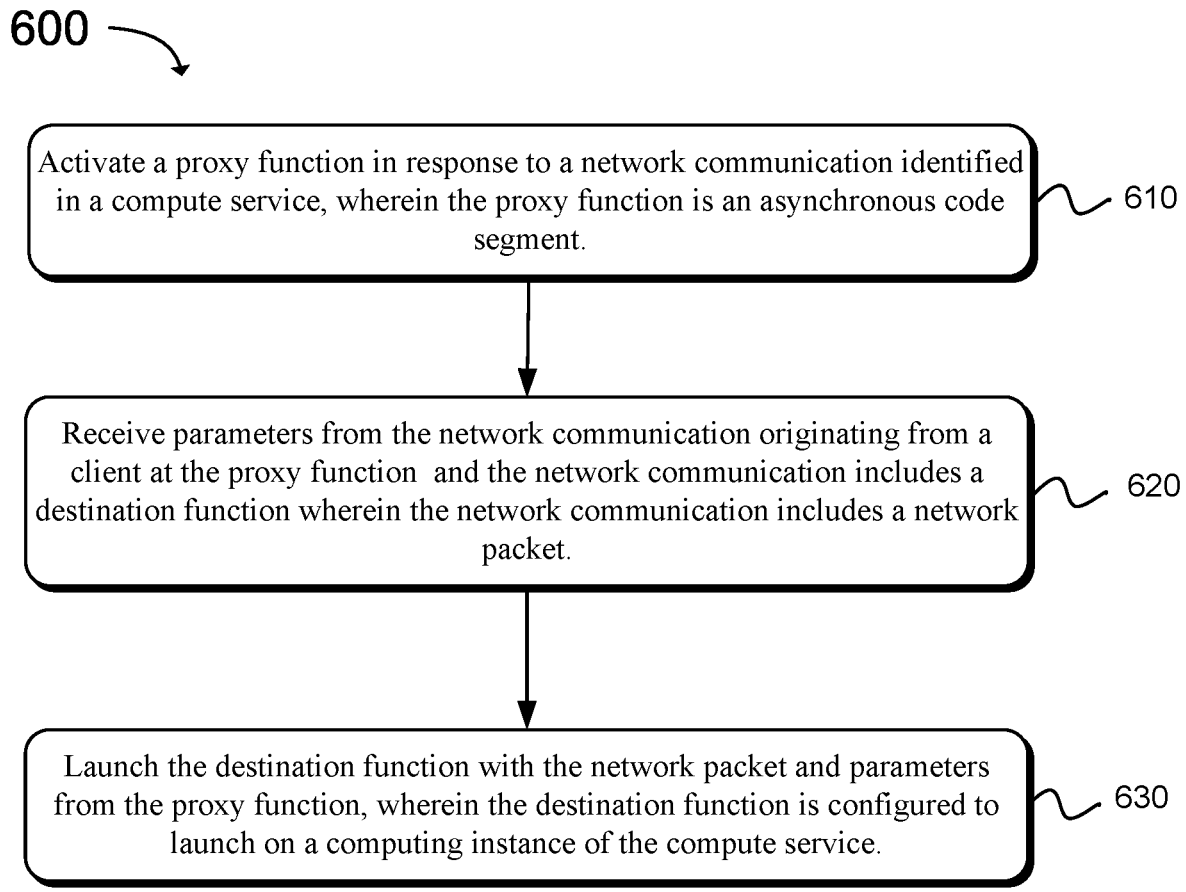

FIG. 6 is a flowchart of an example method 600 for proxying network traffic according to an example of the present technology. The functionality 600 may be implemented as a method and executed as instructions on a machine, where the instructions are included on at least one non-transitory machine-readable storage medium. For example, starting in block 610, a proxy function may be activated in response to a network communication received in a compute service, and the proxy function may be described as an asynchronous code segment. In varying network communication configurations, the network communication may be a data storage event from the service provider environment, a messaging event from the service provider environment, or an API call to the service provider environment. In addition, the network communication may be triggered by an event occurring in the service provider environment. In one configuration, the proxy function may be initiated through function declarators in application code on a client device.

Another operation is to receive parameters from the network communication originating from a client at the proxy function, where the parameters identify a destination function and a network packet, as in block 620. In one aspect of the method, the network communication may be filtered at the proxy function. In another aspect of the method, the proxy function may copy the packets and network address translation (NAT) may be performed in relation to the network packet at the proxy function. The network packet may be copied into memory at the proxy function before the network packet is sent to the destination function, and a copy of the network packet may be sent through a tunnel to a packet receiver associated with an administrator for monitoring network traffic. Further, the network packet may be sent from the destination function to a networking client outside of the service provider environment. Results may be received from the networking client by the destination function that are based on the networking client processing the parameters of the network packet, and the results may be sent from the destination function to the proxy function to be returned to the client.

The destination function may be launched with the network packet and parameters from the proxy function, and the destination function may be configured to launch on a computing instance of the compute service, as in block 630. Return values may be received at the proxy function from the destination function based on the parameters and the network packet being processed by the destination function, and the return values may be sent to the client from the proxy function. In one aspect of the method, subsequent network traffic associated with the network communication at the proxy function may be received, and network packets associated with the subsequent network traffic may be sent from the proxy function to the destination function.

In one aspect of the method 600, networking functions may be overridden with the function declarators in application code running on a client device, and the network traffic may be sent to the proxy function. In one aspect, a network communication originated by an application associated with the client may be generated using a software development kit (SDK) implemented with the application. The SDK may be used to override the application network functions in order to capture the network packet and may send out the network communication with the network packet to the proxy function in the service provider environment.

Figure 7:
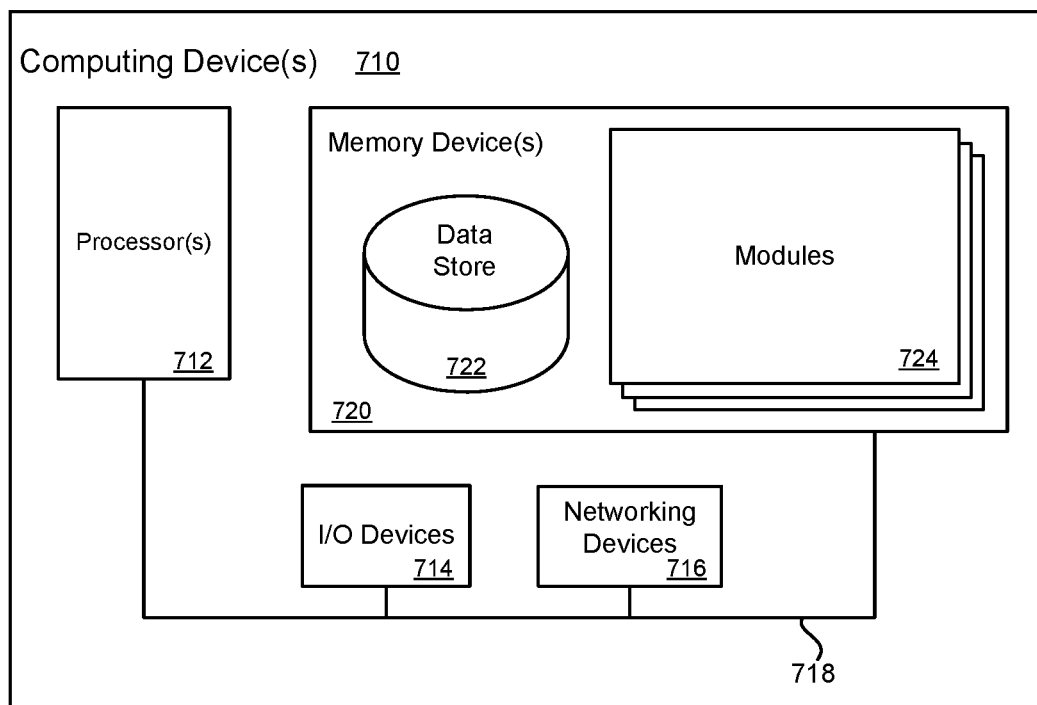
FIG. 7 is a block diagram that provides an example illustration of a computing device that may be employed in the present technology.

FIG. 7 illustrates an example of a computing device 710 on which modules of this technology may execute. A computing device 710 is illustrated on which a high-level example of the technology may be executed. The computing device 710 may include one or more processors 712 that are in communication with memory devices 720. The computing device may include a local communication interface 718 for the components in the computing device. For example, the local communication interface may be a local data bus and/or any related address or control busses as may be desired.

The memory device 720 may contain modules 724 that are executable by the processor(s) 712 and data for the modules 724. The modules 724 may execute the functions described earlier. A data store 722 may also be located in the memory device 720 for storing data related to the modules 724 and other applications along with an operating system that is executable by the processor(s) 712.

Other applications may also be stored in the memory device 720 and may be executable by the processor(s) 712. Components or modules discussed in this description that may be implemented in the form of software using high programming level languages that are compiled, interpreted or executed using a hybrid of the methods.

The computing device may also have access to I/O (input/output) devices 714 that are usable by the computing devices. An example of an I/O device is a display screen that is available to display output from the computing devices. Other known I/O device may be used with the computing device as desired. Networking devices 716 and similar communication devices may be included in the computing device. The networking devices 716 may be wired or wireless networking devices that connect to the Internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid-state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configuration definitions, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations that comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, wherein the instructions when executed cause a processor to proxy network traffic using a method, the method comprising:
   activating a proxy function in response to a network communication received at a compute service of a service provider environment, wherein the proxy function is an asynchronous code segment configured to execute on the service provider environment;
   receiving parameters from the network communication at the proxy function, wherein the network communication originates from a client and the parameters of the network communication include a destination function identifier and a network packet;
   determining a destination function for the network packet using the destination function identifier;
   applying the proxy function to the network packet to perform filtering on the network packet;
   launching the destination function with the network packet and the parameters, and the parameters are received from the proxy function, wherein the destination function is launched on a computing instance of the compute service and is a segment of program code that is capable of receiving the network packet and the parameters, performing processing, and returning values, and wherein the destination function is terminated at the computing instance once the destination function returns the values;
   receiving the values at the proxy function from the destination function based on the parameters and the network packet processed by the destination function; and
   sending the values to the client from the proxy function in the compute service.

2. The non-transitory machine readable storage medium of claim 1, the method further comprising:
   storing NAT (network address translation) information from the proxy function or a wrapper function in a data store to enable restoring of proxy state information when the proxy function or wrapper function is restarted in the compute service.

3. The non-transitory machine readable storage medium of claim 1, wherein the proxy function acts as a proxy layer for the network packet by filtering or blocking the network packet.

4. The non-transitory machine readable storage medium of claim 1, wherein the proxy function is initiated through function declarators in application code on the client.

5. A method, comprising:
activating a proxy function in response to a network communication identified in a compute service hosted by a service provider environment, wherein the proxy function is an asynchronous code segment;
receiving parameters from the network communication, the network communication originating from a client, wherein the parameters identify a destination function and a network packet;
applying the proxy function to the network packet; and
launching the destination function with both the network packet and the parameters from the proxy function, wherein the destination function is configured to launch on a computing instance of the compute service.

6. The method of claim 5, wherein the network communication comprises: a data storage event from a service provider environment, a messaging event from the service provider environment, or an Application Program Interface (API) call to the service provider environment.

7. The method of claim 5, further comprising:
storing NAT (network address translation) information from the proxy function or a wrapper function to enable restoring of proxy state information when the proxy function or wrapper function is restarted in the compute service.

8. The method of claim 5, wherein the proxy function is initiated through function declarators in application code running on a client device.

9. The method of claim 8, further comprising:
overriding networking functions for network traffic identified in application code running on a client device decorated with the function declarators; and
sending the network traffic with function declarators to the proxy function.

10. The method of claim 5, wherein the network communication is driven by an event occurring in a service provider environment.

11. The method of claim 5, further comprising:
receiving, at the proxy function, subsequent network traffic associated with the network communication; and
sending network packets associated with the subsequent network traffic from the proxy function to the destination function.

12. The method of claim 5, further comprising:
performing network address translation (NAT) for the network packet at the proxy function;
copying the network packet into memory at the proxy function before sending the network packet to the destination function; and
sending a copy of the network packet through a tunnel to a packet receiver associated with an administrator for monitoring network traffic.

13. The method of claim 5, further comprising:
receiving return values at the proxy function from the destination function based on the parameters of the network packet being processed by the destination function; and
sending the return values to a client from the proxy function.

14. The method of claim 5, further comprising:
sending the network packet from the destination function to a networking client outside of the compute service;
receiving results based on the networking client processing the parameters of the network packet; and
sending the results to the proxy function to be returned to the client.

15. The method of claim 13, wherein the results from the networking client are sent to a wrapper function to enable the network packet to be extracted before being sent to the proxy function.

16. The method of claim 5, wherein the network communication is originated by an application associated with a client and the network communication is generated by a software development kit (SDK) implemented with the application, wherein the SDK overrides application network functions to capture the network packet and sends out the network communication with the network packet to the compute service in a service provider environment.

17. The method of claim 5, wherein the network packet in the network communication is filtered at the proxy function.

18. The method of claim 5, wherein a filter of the proxy function blocks predetermined network traffic for security purposes.

19. A system, comprising:
at least one hardware processor executing a compute service configured to:
activate a proxy function in response to a network communication received in the compute service of a service provider environment, wherein the proxy function is an asynchronous code segment configured to execute in the compute service of the service provider environment;
receive parameters from the network communication at the proxy function, the network communication originating from a client, wherein the parameters include a destination function, and a network packet; and
launch the destination function with both the network packet and the parameters from the proxy function, wherein the destination function is configured to launch on a computing instance of the compute service and is capable of receiving parameters, performing processing, and returning a value, and wherein the destination function is terminated at the computing instance once the destination function returns the value.

20. The system of claim 19, wherein the network communication comprises: a data storage event from the service provider environment, a messaging event from the service provider environment, or an Application Program Interface (API) call to the service provider environment.

* * * * *